United States Patent [19]
Hale

[11] 3,865,679
[45] Feb. 11, 1975

[54] SANDWICH PANEL HAVING CELLULAR CORE STRUCTURE WITH REINFORCING ELEMENTS

[76] Inventor: Jesse R. Hale, 25913 Stanford St., Hemet, Calif. 92343

[22] Filed: July 9, 1973

[21] Appl. No.: 377,827

[52] U.S. Cl............... 161/68, 52/618, 161/127, 161/137, 161/161
[51] Int. Cl......... B32b 3/12, B32b 3/26, E04b 2/28
[58] Field of Search....... 161/68, 127, 161, 69, 130, 161/135; 52/615, 618

[56] References Cited
UNITED STATES PATENTS

| | | | |
|---|---|---|---|
| 1,974,279 | 9/1934 | Jones | 161/68 X |
| 2,518,164 | 8/1950 | Meyer | 161/68 X |
| 3,025,935 | 3/1962 | Ensrud et al. | 52/615 X |
| 3,104,194 | 9/1963 | Zahorski | 161/127 X |
| 3,227,600 | 1/1966 | Holland | 161/68 |
| 3,461,632 | 8/1969 | Kuhne | 161/680 X |
| 3,481,643 | 12/1969 | Campbell | 52/618 X |
| 3,525,663 | 8/1970 | Hale | 161/68 |

*Primary Examiner*—Philip Dier
*Attorney, Agent, or Firm*—Edward A. Sokolski

[57] ABSTRACT

A sandwich panel is formed with a cellular core structure having nodes which project in opposite directions from a midplane, the core structure being sandwiched between a pair of face sheets, with the apices of the nodes abutting against the face sheets. Reinforcing elements in the form of linear bar elements are bonded to the sides of a line of nodes and the panel faces against which the apices of these nodes abut, and in certain embodiments, also to the midplane portion of the core. These reinforcing elements operate to resist buckling in long span flexure and to better handle shear loads in short span flexure, thus substantially improving the structural characteristics of the panel.

11 Claims, 8 Drawing Figures

SANDWICH PANEL HAVING CELLULAR CORE STRUCTURE WITH REINFORCING ELEMENTS

This invention relates to sandwich panel structures having cellular cores, and more particularly to such a structure having reinforcing elements incorporated therein.

In my U.S. Pat. No. 3,525,663, a sandwich core panel having anticlastic cellular core structure is described, wherein the core structure is formed by a membrane having a plurality of nodes which project in opposite directions from the midplane of the core. A sandwich panel having a core formed of nodes which project in opposite directions with that of a different structural configuration than that of my patent is described in U.S. Pat. No. 3,227,598 to Robb. Both these types of panels have been found to be structurally critical in buckling or crippling of the compression face when a rectangular or square panel is supported as a beam (on two edges) or on four edges in long span flexure. In short span flexure, the panels are critical in shear perpendicular to the panel faces and the supported edges.

The present invention provides means for alleviating the above indicated structural conditions by providing linear reinforcing elements which may be in the form of bar members attached in a preferred embodiment to the midplane surface areas of the core, the sides of the nodes and the panel surfaces, and in a modified embodiment attached just to the sides of the nodes and the panel surfaces.

It is therefore an object of this invention to improve the structural characteristics of sandwich core panels having cores formed of oppositely projecting nodes.

It is another object of this invention to provide means for reinforcing sandwich core panels having cores formed of oppositely projecting nodes so as to improve the structural characteristic thereof in long span and short span flexure.

Other objects of this invention will become apparent as this description proceeds in connection with the accompanying drawing, of which:

Briefly described, the device of the invention comprises a sandwich core panel having a membrane core structure in the form of node elements which project in opposite directions from a midplane. The panel structure is reinforced by means of longitudinal bar members which run along a row of nodes, preferably located midway between the edges of the panel. These reinforcing members are, in a preferred embodiment of the invention, attached to the midplane surface areas of the core, the sides of the nodes and the panel face sheets. In certain embodiments, the attachment to the midplane of the core is eliminated to leave a fluid communications path to facilitate removal of gases created by brazing and the like. In certain embodiments, the reinforcing bar members extend between the opposite edges of the panel affording reinforcement for long span flexure, while in other embodiments the reinforcing members extend from the edges of the panel only a part of the distance to the center thereof, this type of reinforcement being applicable in handling shear in short span flexure.

Figure 1:
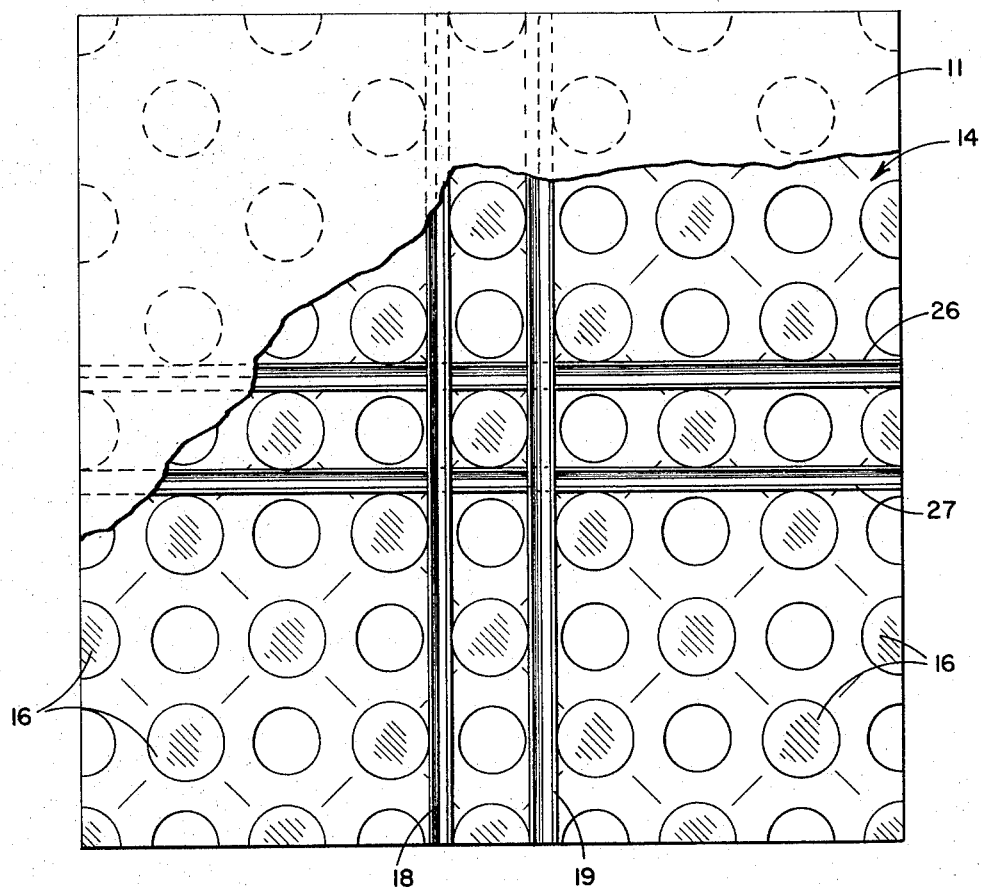
FIG. 1 is a top plan view with partial section cutaway of one embodiment of the invention.
Figure 1A:
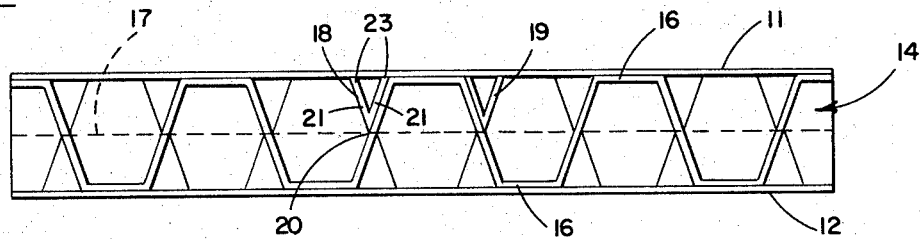
FIG. 1A is an end elevational view of the embodiment of FIG. 1.

Referring now to FIGS. 1 and 1A, one embodiment of the invention is illustrated. A sandwich core panel is formed from a pair of face sheets 11 and 12, which have a core 14 sandwiched therebetween. Core 14 may be formed by a plurality of nodes 16 which project in opposite directions from the midplane 17 of the core. The sandwich core panel structure as thus far described may be of the type described in my aforementioned U.S. Pat. No. 3,525,663.

Running between a first pair of opposite edges of the panel are a pair of parallel bar members 18 and 19 having a V-shaped cross section. The vertices 20 of the bar members are bonded to the core at the midplane 17 thereof, with the sides 21 of these members being bonded to the sides of nodes 16. The ends 23 of the bars are bonded to face sheet 11.

Similarly, bar members 26 and 27 having a V-shaped cross section run between opposite edges of the panel normal to bar members 18 and 19. As for bar members 18 and 19, bar members 26 and 27 run along a row of nodes located midway between a pair of edges of the panel. Bar members 26 and 27 are similar in configuration to bar members 18 and 19 and are attached in the same manner as bars 18 and 19 to the core and the face sheets, the only difference being that bar members 26 and 27 are interrupted where they cross bar members 18 and 19, structural continuity being provided for bar members 26 and 27 by the intervening portions of bar members 18 and 19. The bar members of the embodiment of FIGS. 1 and 1A operate to reinforce the panel for long span flexure such as where the panel is supported as a beam on two edges or on four edges. It has been found that this type of reinforcement greatly increases the ability of the panel to withstand buckling or crippling of the compression face.

Figure 1B:
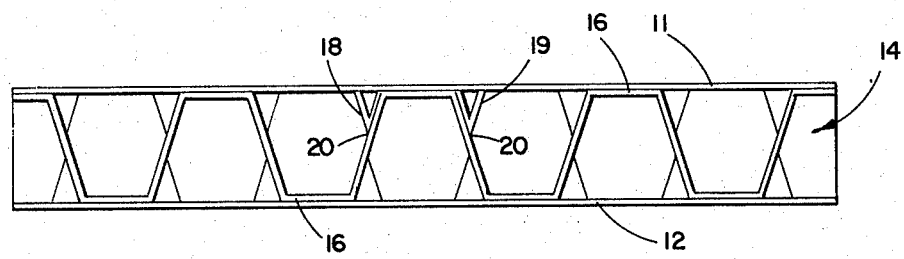
FIG. 1B is a modified version of the embodiment of FIG. 1.

Referring now to FIG. 1B, a variation in the embodiment just described is illustrated. The variation differs from the structure just described only in that the apex portions 20 of the bars 18 and 19 do not extend to and are not attached to the midplane portion of the core, but rather an air space is left between these apex portions of the bars and the core. While this modified structure has somewhat less structural reinforcement capability than the first described embodiment, the open core structure provided thereby is desirable in certain instances to facilitate the clearing of flux and the removal of gases where the various elements of the sandwiched core panel structure are joined together by brazing. It is to be noted that core 14 and reinforcing elements 18, 19, 26 and 27 can be fabricated of various materials such as plastic, metal or paper products, as application requirements may dictate such as disclosed in my prior U.S. Pat. No. 3,525,663.

Figure 2:
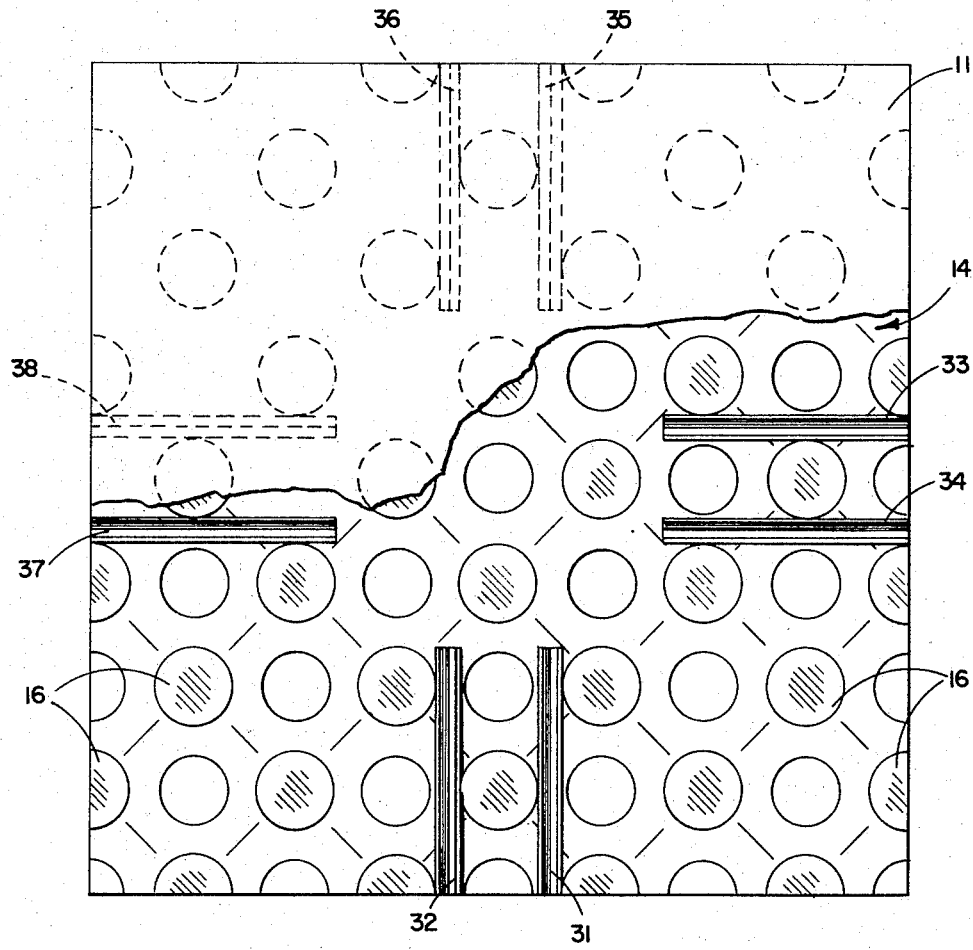
FIG. 2 is a top plan view with partial section cutaway of a second embodiment of the invention.
Figure 2A:
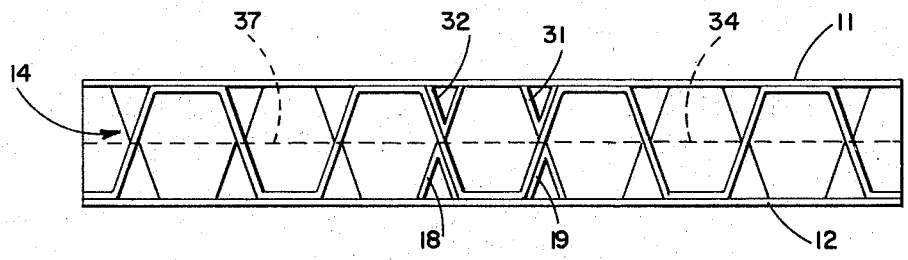
FIG. 2A is an end elevational view of the embodiment of FIG. 2.

Referring now to FIGS. 2 and 2A, a second embodiment of the invention is illustrated, this embodiment being additionally reinforced for handling short span flexural loads. This second embodiment of the invention is incorporated into a panel structure of the same type as for the first embodiment, including a core structure 14 sandwiched between face sheets 11 and 12. The second embodiment further includes bar members 18 and 19 and bar members (not shown) corresponding to the bar members 26 and 27 of the first embodiment for reinforcing the structure for long span flexure. Added to this structure are reinforcing bars 31–38 having V-shaped cross sections which are arranged in pairs for use in providing reinforcement for short span flexure. This reinforcement enhances the ability of the panel to handle loads in shear perpendicular to the panel faces. Reinforcing bars 31–38 are similar in cross-sectional configuration to the supporting bars of the first embodiment, and are bonded in similar fashion to the midplane of the core, the sides of the nodes and the surfaces of face sheet 11. They are also positioned alongside rows of nodes 16 located halfway between opposite edges of the panel. They differ from the support bars of the previous embodiment in that they only extend part way towards the center of the panel and do not extend between the opposite edges thereof, the central portion of the panel being without any reinforcement means. A panel such as that shown in FIGS. 2 and 2A thus has reinforcement provided for both long and short span flexure. It is to be noted that the reinforcement bars 31-38 for short span flexure can be used in the panel structure separate and apart from bars 18 and 19 in situations where long span flexural reinforcement is not required.

Figure 3:
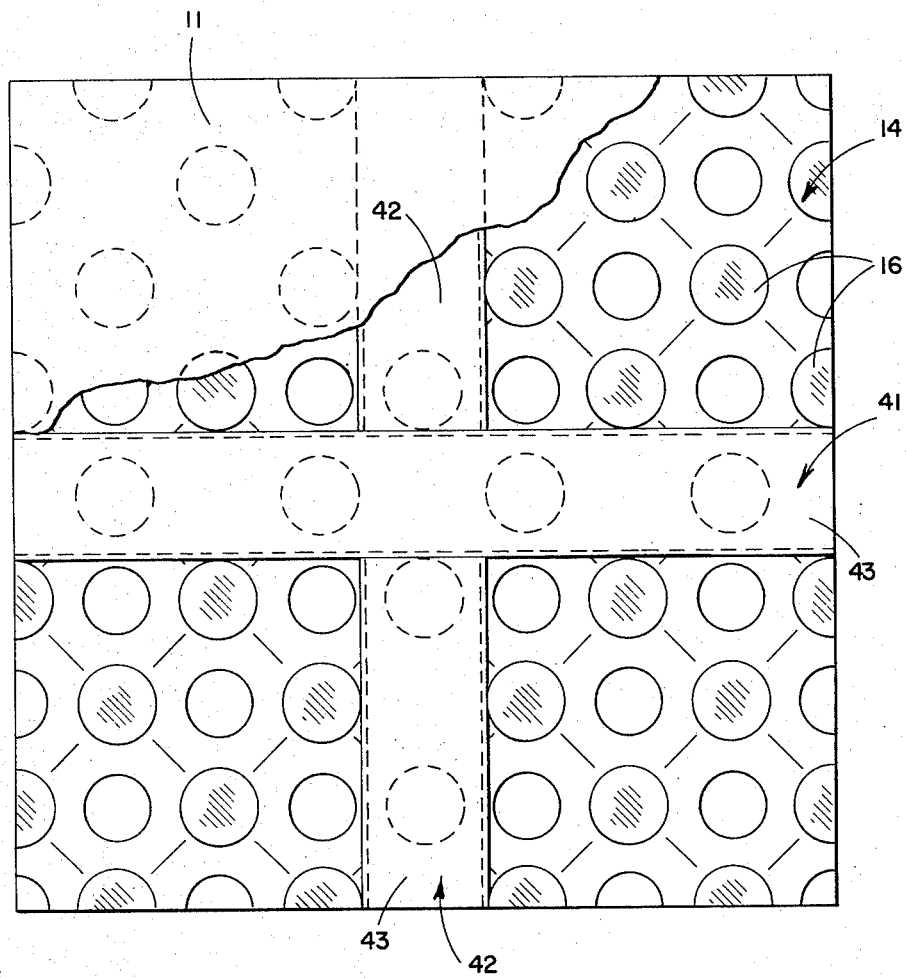
FIG. 3 is a top plan view with partial cutaway section of a third embodiment of the invention.
Figure 3A:
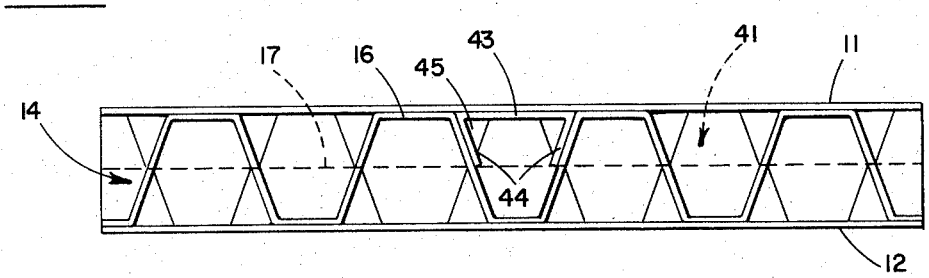
FIG. 3A is an end elevational view of the embodiment of FIG. 3.

Referring now to FIGS. 3 and 3A, still another embodiment of the invention is illustrated. In this instance, long span flexural reinforcement is provided for a sandwich core panel of the same type as described in connection with the previous embodiment, this end result being achieved by means of reinforcement bars 41 and 42. Reinforcement bars 41 and 42 are C-shaped in cross section and have flat top portions 43 and leg portions 44 which extend inwardly from flat portions 43. The sides of leg portions 44 are bonded to the sides of nodes 16, while the ends of leg portions 44 are bonded to the core at the midplane 17 thereof. The top face of flat portion 43 is bonded to face sheet 11. It is to be noted that in order to accommodate bar members 41 and 42, the top portions of the nodes which these bar members overlie must be reduced in height. As for the embodiment of FIG. 3, one bar member 42 is interrupted by the other bar member 43, structural continuity being provided between the separated sections of bar member 42 by means of the intervening portions of bar member 43. It is to be noted that the side portions 44 of the bar members are not joined to the sides of the nodes which they overlie, but are rather joined to the sides of adjacent nodes. Thus, fluid channels 45 are provided along the core members which facilitates the clearing of flux and the removal of gases where the elements are joined together by means such as brazing. Channels 45 also facilitate cooling of the core.

Figure 3B:
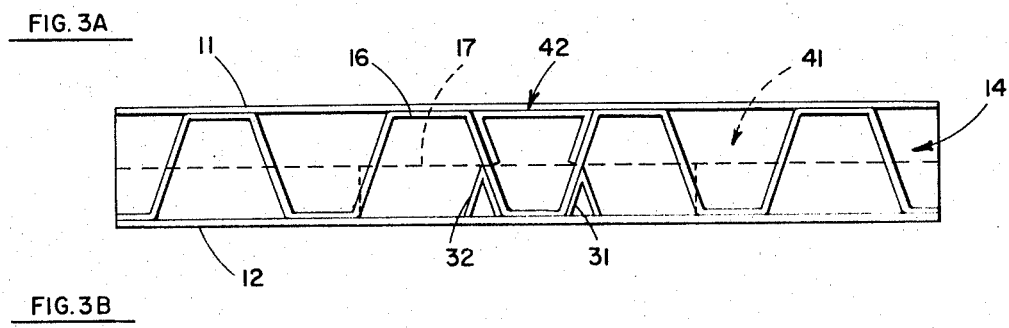
FIG. 3B is a modified version of the embodiment of FIG. 3 having reinforcing elements for handling short span flexure added thereto.

Referring now to FIG. 3B, a variation of the embodiment of FIG. 3 is illustrated wherein reinforcing members 31 and 32, as well as reinforcing members 33–38 (not shown), as described in connection with FIG. 2, provide additional reinforcement for short span flexure.

The device of the invention thus affords reinforcement for sandwich core panels with core structure having oppositely projecting nodes, such reinforcement enhancing the structural capabilities of the panel for long and short span flexure.

While the invention has been described and illustrated in detail, it is to be clearly understood that this is intended by way of illustration and example only and is not to be taken by way of limitation, the spirit and scope of this invention being limited only by the terms of the following claims.

I claim:

1. In a sandwich panel formed from a cellular core structure sandwiched between a pair of face sheets, said core structure having nodes which project in opposite directions from a midplane with the apices of said nodes abutting against said face sheets, the improvement comprising:
   first reinforcing bar means running along the sides of a first row of said nodes, said bar means being bonded to the sides of the nodes of said core, the ends of said bar means being bonded to a surface of one of said face sheets, and
   second reinforcing bar means running along the sides of a second row of said nodes, said second reinforcing bar means being bonded to the sides of nodes of said core, the ends of said bar means being bonded to said surface of said one of said face sheets.

2. The panel of claim 1 wherein said first and second reinforcing bar means are additionally bonded to said core structure at the midplane portion thereof.

3. The panel of claim 1 wherein said first and second reinforcing bar means are each in the form of a pair of "V" cross section bars positioned on opposite sides of a respective one of said rows of said nodes.

4. The panel of claim 1 wherein said bar means are each in the form of a C cross-section bar having a flat top portion and leg portions which extend inwardly from said top portion, the top portion being attached to the apices of the nodes of said first and second row of nodes respectively, the leg portions being attached to the sides of the rows of nodes adjacent to said first and second row of nodes respectively.

5. The panel of claim 1 wherein the first and second rows of nodes are oriented normally to each other and are each located midway between a pair of opposite edges of the panel.

6. The panel of claim 1 wherein said bar means structurally extend between opposite edges of said panel through the central portion thereof to provide reinforcement for long span flexure.

7. The panel of claim 1 wherein said bar means extend from the edges of the panel only part way towards the center of the panel to provide shear reinforcement in short span flexure.

8. The panel of claim 6 and further including third and fourth reinforcing bar means extending from the edges of the panel only part way towards the center of the panel, said third and fourth bar means running along third and fourth rows of said nodes extending in a direction opposite to said first and second rows of nodes and being attached to the sides of said third and fourth rows of nodes and to a surface of the other of the face sheets.

9. In a sandwich panel formed from a cellular core structure sandwiched between a pair of face sheets, said core structure having nodes which project in opposite directions from a midplane with the apices of said nodes abutting against said face sheets, the improvement comprising:

first reinforcing bar means running between a first pair of edges of the panel along the sides of a first row of said nodes spaced midway between a second pair of opposite edges of said panel, said bar means being bonded to the core along the sides of nodes thereof and at the midplane of the core, the ends of said bar means being bonded to a surface of one of said face sheets and second reinforcing bar means running between a second pair of edges of the panel along the sides of a second row of said nodes spaced midway between said first pair of edges, said second bar means being oriented normally to the first bar means and being bonded to the core along the sides of the nodes thereof and at the core midplane, the ends of said bar means being bonded to said surface of said one of said face sheets.

10. The panel of claim 9 wherein said reinforcing bar each comprises a pair of V cross-section bars positioned on opposite sides of one of the rows of said nodes.

11. The panel of claim 9 wherein said bar means are each in the form of a C cross-section bar having a flat top portion and leg portions which extend inwardly from said top portion, the top portion being attached to the apices of the nodes of said first and second row of nodes respectively, the leg portions being attached to the sides of the rows of nodes adjacent to said first and second row of nodes respectively.

* * * * *